(12) United States Patent
Chou et al.

(10) Patent No.: US 12,265,019 B2
(45) Date of Patent: Apr. 1, 2025

(54) COMPACT IMAGING-BASED SENSORS

(71) Applicant: Essenlix Corporation, Monmouth Junction, NJ (US)

(72) Inventors: Stephen Y. Chou, Princeton, NJ (US); Wei Ding, Princeton, NJ (US); Ji Qi, Hillsborough, NJ (US); Jun Tian, Belle Mead, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 17/268,677

(22) PCT Filed: Aug. 16, 2019

(86) PCT No.: PCT/US2019/046953
§ 371 (c)(1),
(2) Date: Feb. 16, 2021

(87) PCT Pub. No.: WO2020/037292
PCT Pub. Date: Feb. 20, 2020

(65) Prior Publication Data
US 2021/0181095 A1    Jun. 17, 2021

Related U.S. Application Data

(60) Provisional application No. 62/719,020, filed on Aug. 16, 2018.

(51) Int. Cl.
*G01N 21/31* (2006.01)
*G01N 21/01* (2006.01)
(Continued)

(52) U.S. Cl.
CPC ............. *G01N 21/31* (2013.01); *G01N 21/01* (2013.01); *G02B 21/0008* (2013.01);
(Continued)

(58) Field of Classification Search
CPC .... G01N 21/31; G01N 21/01; G01N 2201/02; G01N 2201/061; G01N 2201/062; G01N 2201/0635; G01N 2201/08; G01B 21/0008; G01B 21/06; G01B 21/18; H04N 5/2256; H04N 5/2257; H04M 1/0264; A61B 1/00; A61B 1/00105; A61B 1/00167;
(Continued)

(56) References Cited

U.S. PATENT DOCUMENTS 9,990,523 B2    6/2018   Gifford et al.
10,890,494 B1 *  1/2021   Schmitt ................... A61B 1/07
(Continued)

FOREIGN PATENT DOCUMENTS

WO    2017048871 A1    3/2017

OTHER PUBLICATIONS

Written Opinion of the International Searching Authority for PCT/US2019/046953 established by the ISA/US completed on Feb. 4, 2020.

*Primary Examiner* — Tri T Ton

(57) ABSTRACT

Disclosed is an optical system for interrogating a sample, an optical system for measuring the spectrum of a beam of light, an optical system for measuring the spectrum of two beams of light, a compact imaging-based sensor or sensors, and combinations thereof.

40 Claims, 5 Drawing Sheets

(51) Int. Cl.
    *G02B 21/00*     (2006.01)
    *G02B 21/06*     (2006.01)
    *G02B 21/18*     (2006.01)
    *H04N 23/56*     (2023.01)
    *H04N 23/57*     (2023.01)
    *H04M 1/02*     (2006.01)

(52) U.S. Cl.
    CPC .............. *G02B 21/06* (2013.01); *G02B 21/18* (2013.01); *H04N 23/56* (2023.01); *H04N 23/57* (2023.01); *G01N 2201/02* (2013.01); *G01N 2201/061* (2013.01); *G01N 2201/062* (2013.01); *G01N 2201/0635* (2013.01); *G01N 2201/08* (2013.01); *H04M 1/0264* (2013.01)

(58) Field of Classification Search
    CPC ......... A61B 1/04; A61B 1/043; A61B 1/0638; A61B 1/0684; A61B 1/07; A61B 5/0071; A61B 5/6898; G01J 3/0218; G01J 3/0291; G01J 3/36; G01J 3/4406
    USPC .......................... 356/402–425, 123–127, 244
    See application file for complete search history.

(56) References Cited

U.S. PATENT DOCUMENTS

| | | |
|---|---|---|
| 2015/0177147 A1 | 6/2015 | Mangan et al. |
| 2016/0320306 A1 | 11/2016 | Huffman et al. |
| 2017/0209033 A1 | 7/2017 | Yu et al. |
| 2018/0246089 A1* | 8/2018 | Chou ..................... G16H 80/00 |

* cited by examiner

COMPACT IMAGING-BASED SENSORS

CROSS-REFERENCE TO RELATED APPLICATIONS

This application is a National Stage entry (§ 371) application of International Application No. PCT/US2019/046953, filed on Aug. 16, 2019, which claims the benefit of priority of U.S. Provisional Patent Application No. 62/719,020, filed on Aug. 16, 2018, the contents of which is relied upon and incorporated herein by reference in its entirety. The entire disclosure of any publication or patent document mentioned herein is entirely incorporated by reference.

FIELD

The present disclosure is related to devices and methods for performing biological and chemical assays, and computational imaging.

BACKGROUND

In biological and chemical assays (e.g. diagnostic testing), often it needs to be simple, fast, and have sensitive assaying, including imaging. The disclosure provides, devices and methods for simple, fast, and sensitive assaying, including imaging.

SUMMARY

In one or more embodiments, the disclosure provides at least an optical system for interrogating a sample, an optical system for measuring the spectrum of a beam of light, an optical system for measuring the spectrum of two beams of light, a compact imaging-based sensor or sensors, or combinations thereof.

BRIEF DESCRIPTION OF THE DRAWINGS

The drawings are for illustration purposes only. The drawings may or may not be to scale.

DETAILED DESCRIPTION OF EXEMPLARY EMBODIMENTS

The following detailed description illustrates some embodiments of the invention by way of example and not by way of limitation. The section headings and any subtitles used herein are for organizational purposes only and are not to be construed as limiting the subject matter described in any way. The contents under a section heading and/or subtitle are not limited to the section heading and/or subtitle but apply to the entire description of the disclosure.

Several exemplary embodiments are as follows:
an optical adaptor for bright-field and fluorescent microscopy imaging attached to a smartphone;
an optical adaptor for colorimetric measurement attached to a smartphone using tilted fiber end face as a light source;
an optical adaptor for colorimetric measurement attached to a smartphone using side-illumination of a ring-shape fiber as light source;
a device and methods of tomography;
a machine learning assisted assay and imaging;
a device and methods of tissue staining and cell imaging; and
a dual-lens imaging system.

One aspect of the disclosure provides devices and methods for measuring optical properties of a material (including the optical spectrum) easily, rapidly, and at low cost.

Another aspect of the disclosure provides the devices and methods for analyzing the concentration of an analyte in micro-volume liquid based on spectrophotometry.

Another aspect of the disclosure provides a sample holder combined with a system, wherein the sample holder can manipulate a sample ready for measurement in a single step and a few seconds, and works for either a flowable fluid sample or a non-flowable but deformable sample.

A-1. Compact Spectrometer Using Smartphone

Figure 3:
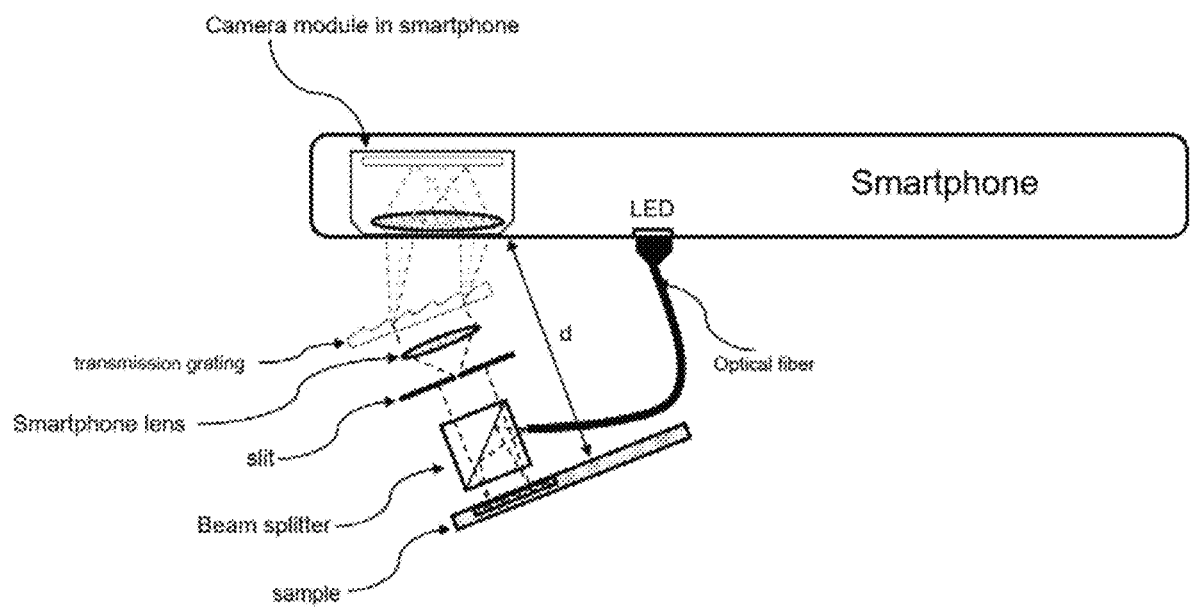
FIG. 3 schematic drawing of an optical system of sample spectrum testing system based on smartphone.

FIG. 3 shows a smartphone based optical system for measuring spectrum from the sample, comprising a smartphone with camera module and light source, a transmission grating, a slit, an external lens, a beam splitter and an optical fiber. The optical fiber guides the light from the LED to the beam splitter and the beam splitter redirect the light to the QMAX sample card. The reflected light by the sample go through the beam splitter, a slit, an external lens, a grating and the camera to form a spectrum image on the sensor of the camera module of the smartphone. The external lens, slit, beam splitter and sample are aligned on a same optical axis which is perpendicular to the grating. The optical axis of the smartphone camera is not perpendicular to the grating with an angle less than 90 degree.

Figure 4:
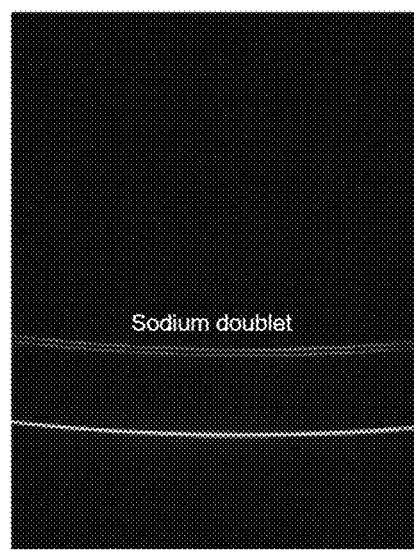
FIG. 4 is a RGB color spectrum image of a mercury lamp measured by the smartphone spectrometer optical system shown in FIG. 3.
Figure 5:
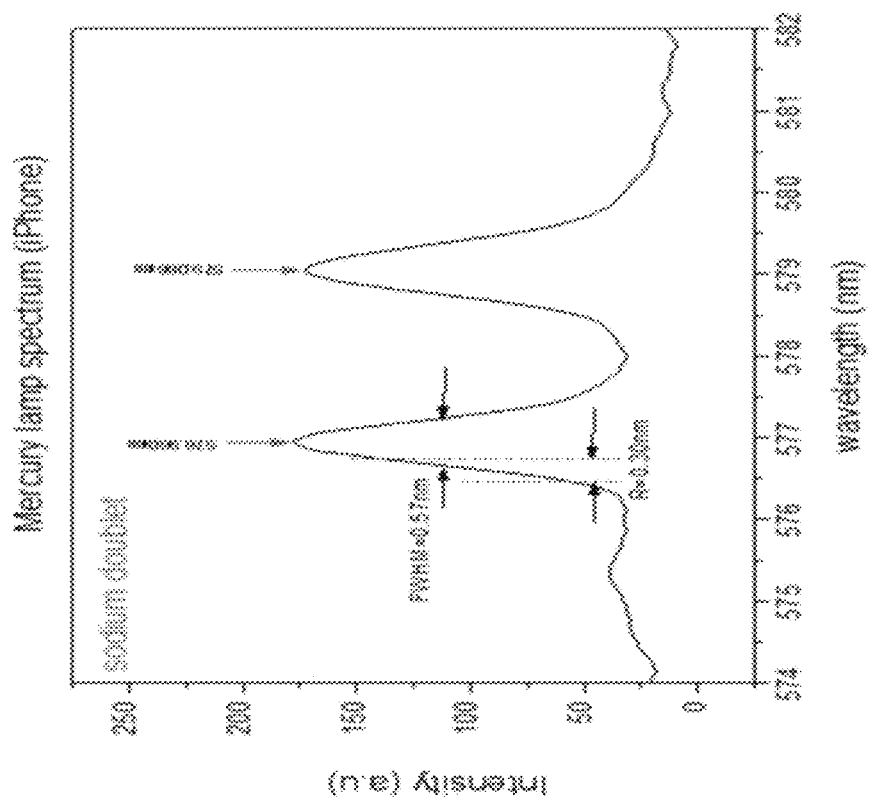
FIG. 5 is the spectrum of a mercury lamp converted from the RGB color spectrum image FIG. 4.
Figure 5:
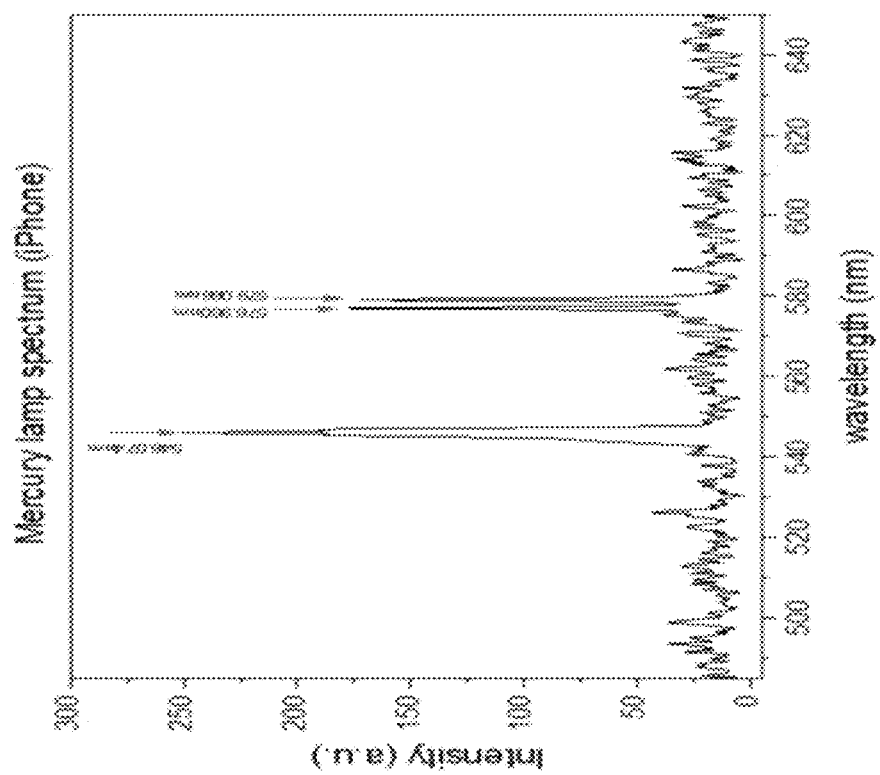

FIG. 4 is the RGB color spectrum image of a mercury lamp measured by the smartphone spectrometer system described in FIG. 3. FIG. 5 is the spectrum of a mercury lamp converted from the RGB color spectrum image shown in FIG. 4. It is clearly seen that the sodium doublet at 576.96 nm and 579.07 nm can be resolved. The FWHM of the peak is 0.57 nm and the resolution is hence half of the FWHM 0.3 nm.

Another aspect of the disclosure is to provide a sample holder together with the system, wherein the sample holder can manipulate a sample ready to measurement in a single step and a few seconds, and works for either flowable fluid and non-flowable but deformable samples.

EXAMPLE EMBODIMENTS

An optical system for measuring a spectrum of light, comprising:
a light source;
an optical fiber;
a beam splitter;
a slit;
an external first lens;
a grating; and
a camera module having a second lens;
wherein:

the light source generates photons;

the optical fiber transmits the photons from the source through the beam splitter to illuminate and interrogate a sample;

the light from the interrogated sample passes through the beam splitter, the slit, the external first lens, the grating, and then to the camera module;

the camera module and the light source are a part of a smartphone, and the optical system measures and records the light spectrum of the sample.

The optical system of measuring a spectrum of light of any prior embodiment, further comprising a lever having components of two or more different optical systems mounted to the lever, and the lever is movable to select the optical functionality of the optical system.

The optical system of measuring a spectrum of light of any prior embodiment, wherein the light source is an LED, laser, fluorescent bulb, filament lamp, or any combination thereof.

The optical system of measuring a spectrum of light of any prior embodiment, wherein the spectrum of the light source is UV, visible, IR, or any combination thereof.

The optical system of measuring spectrum of light of any prior embodiment, wherein the bandwidth spectrum of the light source is at least one value selected from 10 nm, 50 nm, 200 nm, 500 nm, 1000 nm, 5 um, 100 um, including intermediate values or ranges.

The optical system of measuring a spectrum of light of any prior embodiment, wherein the beam splitter is a cube beam splitter, a plate beam splitter, or any combination thereof.

The optical system of measuring a spectrum of light of any prior embodiment, wherein the reflection:transmission ratio of the beam splitter is at least one value selected from 10:90, 20:80, 30:70, 40:60, including intermediate values or ranges.

A-2. Compact Multi-Functional Optical Sensors

Figure 6:
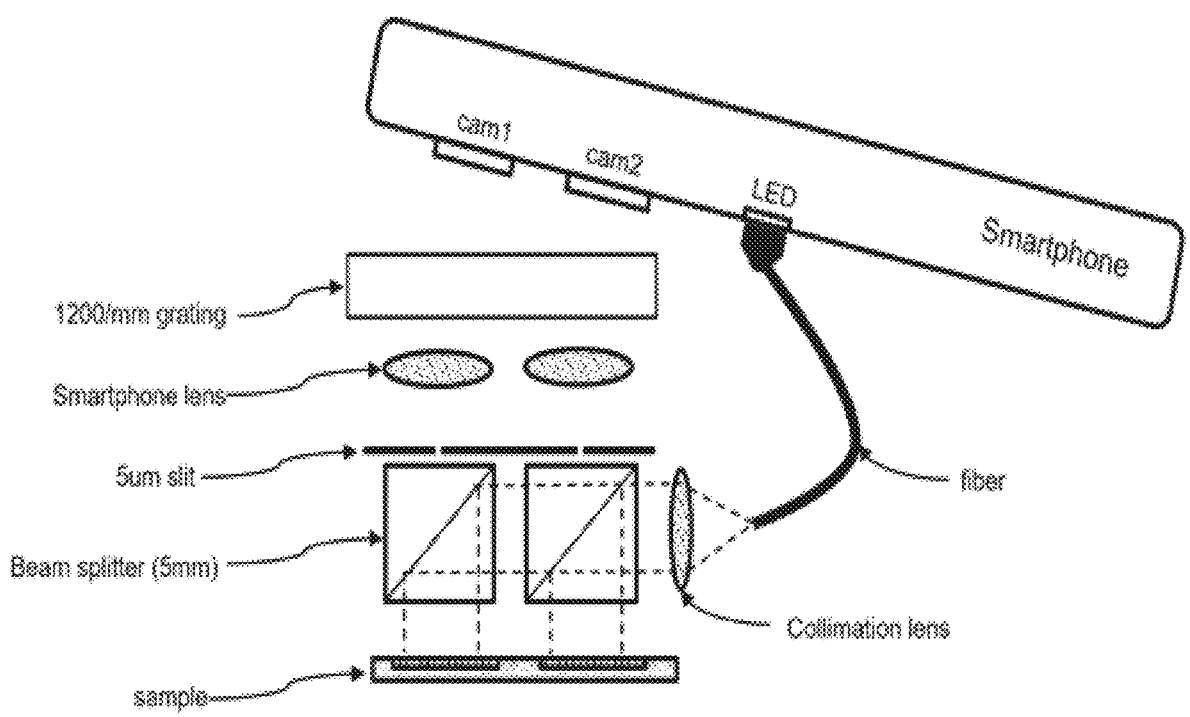
FIG. 6 is a schematic drawing of an optical system based on smartphone that can measure the spectrum of two beams of light at the same time.

FIG. 6 shows a smartphone based optical system for measuring spectrum from the sample, comprising a smartphone with two camera modules and a light source, an optical fiber, two groups of optical elements of which each comprising a transmission grating, a slit, an external lens, a beam splitter. The optical fiber guides the light from the light source to the first beam splitter and the beam splitter redirect a portion of the light energy to the first sample area. The other portion of the light energy go through the first beam splitter towards the second beam splitter. The second beam splitter redirect the light to the second sample area. The reflected light by the first sample area go through the first group of a beam splitter, a slit, an external lens, a grating and the camera to form a spectrum image on the sensor of the first camera module of the smartphone. The reflected light by the second sample area go through the second group of a beam splitter, a slit, an external lens, a grating and the camera to form a spectrum image on the sensor of the first camera module of the smartphone. The external lens, slit, beam splitter and sample are aligned on a same optical axis which is perpendicular to the grating. The optical axis of the smartphone camera is not perpendicular to the grating with an angle less than 90 degree.

In an embodiment, the disclosure provides:

An optical system for measuring the spectrum of two beams of light, comprising: two of the abovementioned and illustrated optical systems, wherein each of the optical systems provides one beam of light;
    an optical fiber; and
    a light source.

wherein the two beams of light are generated for a measurement selected from at least one of: plasmonic, fluorescent, absorption, colorimetric, or a combination of any two measurements.

The optical system of measuring a spectrum of light of any prior embodiment, wherein the slit has a width of at least 0.1 um, 1 um, 5 um, 10 um, 100 um, 500 um, including intermediate values or ranges.

The optical system of measuring a spectrum of light of any prior embodiment, wherein the slit has a preferred width of from 1 um to 5 um.

The optical system of measuring a spectrum of light of any prior embodiment, wherein the external first lens and the second lens of the camera module of a smartphone are the same type of lens.

The optical system of measuring a spectrum of light of any prior embodiment, wherein the effective focal length of the external first lens is less than 3 mm, 5 mm, 10 mm, 20 mm, or any intermediate value or range combination.

The optical system of measuring a spectrum of light of any prior embodiment, wherein the grating is a transmission grating, or a blazed grating.

The optical system of measuring a spectrum of light of any prior embodiment, wherein the pitch of the grating is at least one of 2000 l/mm, 1200 l/mm, 800 l/mm, 300 l/mm, or any intermediate value or range combination.

The optical system of measuring a spectrum of light of any prior embodiment, wherein the preferred pitch of the grating is at least one of 800 lines/mm, 1200 lines/mm, or any intermediate value or range combination.

The optical system of measuring a spectrum of light of any prior embodiment, wherein the external first lens, the slit, and the beam splitter are aligned on the same optical axis and the optical axis is perpendicular to the grating.

The optical system of measuring a spectrum of light of any prior embodiment, wherein the optical axis of the camera module is not perpendicular to the grating, and the angle between the optical axis and a grating axis is from 20 to 80 degrees, or any intermediate value or range combination.

The optical system of measuring a spectrum of light of any prior embodiment, wherein the optical axis of the camera module is not perpendicular to the pitch of the grating, the angle between the optical axis and the grating axis is from 30 to 50 degrees for visible light, and the preferred pitch of the grating is from 800 l/mm to 1200 l/mm.

The optical system of measuring a spectrum of light of any prior embodiment, wherein the grating, the external first lens, the slit, and the beam splitter are mounted on an optics lever, and the optics lever is configured to move into the field of view of the camera and the optical fiber transmitted light source of the camera module of the smartphone.

The optical system of measuring a spectrum of light of any prior embodiment, wherein the optics lever mounts an optical element of multiple different optical systems at different positions and moves the optical element between different positions to switch the functionality of the optical system.

A.3 Sample Holders

Figure 1:
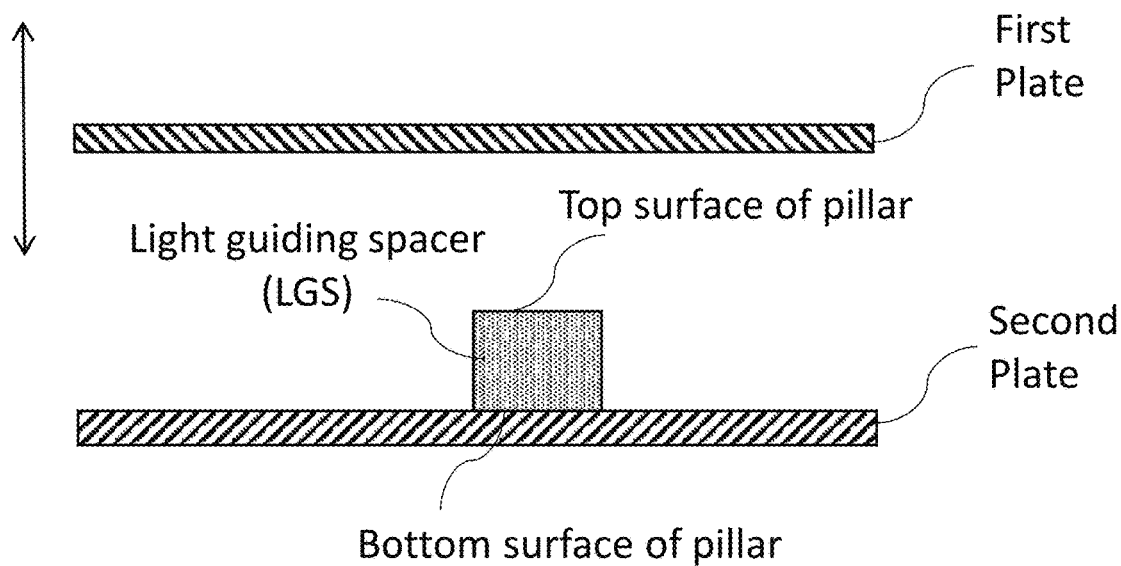
FIG. 1 is a schematic illustration of cross section of the micro-volume spectrophotometry-analysis device in an open configuration.
Figure 2:
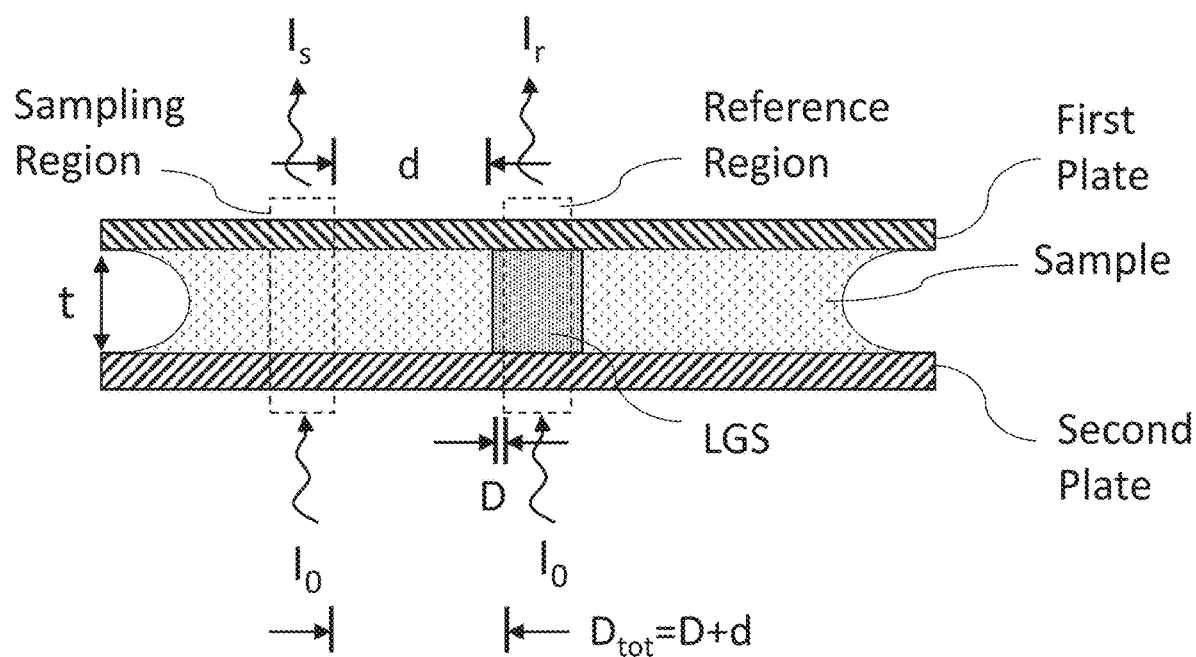
FIG. 2 is a schematic illustration of cross section of the micro-volume spectrophotometry-analysis device in a close configuration.

According to the disclosure, as shown in FIGS. 1 and 2, one embodiment of a sample holder, termed OAC (i.e. optical analysis card), for analyzing an analyte in a sample (e.g., hemoglobin in a blood sample) by optical transmission using light, comprising:
    a first plate, a second plate, a light guiding spacer (LGS), a sampling region, and a reference region, wherein:

(i) the first plate and second plate are configured to sandwich a sample, this is for an optical transmission analysis by light, into a thin layer between the plates, and each plate has a sample contact area on its inner surface that contacts the sample;

(ii) the light-guiding spacer (LSG) has a pillar shape, is sandwiched between the two plates with each end of the pillar in direct contact to one of the plates forming a LGS-plate contact area, and is configured to allow the light transmits from the first plate, through the LSG, to the second plate without going through a sample, (iii) the sampling region is the region that the light can go through, in sequence, the first plate, the sample, and the second plate, wherein the sampling region does not have the LSG; and (iv) the reference region is the region that the light transmits through, in sequence, the first plate, the light-guiding spacer, and the second plate, without going through the sample;

wherein the LGS-contact areas and a lateral cross-section of the LGS are larger than the wavelength of the light, wherein the light-guiding spacer is surrounded by or near the sample; and wherein the sample in the sampling region has a thickness of 500 um or less.

The term "reference region" of an OAC device refers to the region of the device where a light guiding spacer is sandwich between the two plates and has a direct contact respectively to each plate, wherein, in the reference region, a probing light transmits through, in sequence, the first plate, the light-guiding spacer, and the second plate, without going through the sample (FIGS. 1 and 2).

The term "sampling region" of an OAC device refers to the region of the device where the sample is between the two plates without a LGS in that region; namely, in the sampling region, a probing light transmits through, in sequence, the first plate, a sample between the two plates, and the second plate without encountering LGS (FIGS. 1 and 2).

At least a portion of the plates in the reference region and the sampling region are light transmissive.

According to the disclosure, as shown in FIGS. 1 and 2, a sample holder, termed OAC (i.e. optical analysis card), has at least a "sampling region" and a "reference region", and the sample layer light absorption coefficient is determined by taking a ratio of the light transmitted through the sampling region to that transmitted through the reference region.

In some embodiments, the sample holder (also termed device) further comprises a plurality of light guiding spacers, that have substantially uniform height, and wherein at least one of the light-guiding spacers is inside the sample contact area.

In some embodiments, the first plate and the second plate are fixed with the LGS. In some embodiments, as shown in FIG. 1, the first plate and the second plate are movable relative to each other into different configurations including an open configuration and a closed configuration. In an open configuration, the plates are separated a part and a sample is deposited. In a closed configuration, the first and second plate is respectively in touch with a flat end of the LGS.

In some embodiments, the first plate and the second plate in the sample regions and the references have uniform thickness and are light transmissive.

The materials of the plates are plastics, glass, or other materials described by the disclosure.

In some embodiments, other spacers are used to regulate the spacing between the first plate and the second plate, and hence the sample thickness.

Sample OD Measurement Methods.

According to the disclosure, a properties of the sample is determined by measuring the OD of a thin layer of the sample, where the OD is determined from the ratio of the light transmitted through the sampling region of OAC to that transmitted through the reference region of OAC.

In some embodiments, the image of a sample in a sample holder is take by a camera and analyzed. (e.g. FIG. 2)

In some embodiments, the wavelength of the light is in the range of 500 nm to 1200 nm, 200 nm to 3000 nm, 3000 nm to 30,000 nm, or 100 nm to 200 nm.

3.1 Light Absorption Through a Sample Determined by Light Transmissions in Sampling and Reference Regions For the light with an incident light intensity, $I_0$, the transmitted light intensity through a sample, $I_s$ is, using Beer-Lambert's Law, given by:

$$OD_s = \ln\left(\frac{I_0}{I_s}\right) = \varepsilon_s c L_s,$$

where, $\varepsilon_s$ is the extinction coefficient of the sample (e.g. hemoglobin), c is the average concentration of the sample (e.g. hemoglobin), and L is the length of light path through the sample. ($\varepsilon$ in cm$^{-1}$/M, c in M, L in cm), and $OD_s$ refers the optical density through sample.

For the light with an incident light intensity, $I_0$, the transmitted light intensity through a light-guiding spacer of a length $L_r$, $I_r$ is, using Beer-Lambert's Law, given by:

$$OD_r = \ln\left(\frac{I_0}{I_r}\right) = \alpha_r L_r,$$

where $\alpha_r$ is the absorption coefficient of the light-guiding spacer, and L is the length of light path through the sample, and $OD_s$ refers the optical density through the light guiding spacer, which is used as a reference.

Subtracting the first equation by the second equation leads to:

$$OD_s - OD_r = \ln\left(\frac{I_0}{I_s}\right) - \ln\left(\frac{I_0}{I_r}\right) = \ln\left(\frac{I_r}{I_s}\right) = \varepsilon_s c L_s - \alpha_r L_r$$

According to the disclosure, the above equation shows that the absorption coefficient of a sample layer can be determined by taking a ratio of the transmitted light through the sampling region to that through the reference region, without measuring the incident light (assuming the incident light in the two regions are significantly the same).

3.3 Optical Transmission Sample Analysis by Comparing the Light Transmission from the Sampling Region and from the Reference Region.

According to the disclosure, the light absorption (and optical density ("OD")) through a thin sample layer is measured by comparing the light transmission from the sample region and from the reference region.

In some cases, the comparison is taking ratio of the light transmission from the sample region to the reference region.

3.4 Improved Optical Transmission Sample Analysis

In many real measurement situations, there are many imperfections that can significantly reduce the accuracy of OD measurements. For examples, the sample in a sample holder and/or the sample holder itself can have a nonuniform thickness. There are defects in the sample or sample holder, such as air bubbles, dust, or others that can an optical transmission different from that through a perfect (i.e. ideal sample). The light intensity may not be uniform in the entire measurement area.

The disclosure has a number of ways to reduce errors in an optical transmission sample analysis (OTSA) caused by the imperfection. According to the disclosure, to improve the OD measurement accuracy, the following features, devices and methods below (i.e. in section 1.4 and its subsection) are used individually or a combination of thereof.

3.4.1 Reduction of Light Scattering by LGS Sidewall and/or LGS-Plate Interface

According to the disclosure, in one of the embodiments of the OD measurement methods that measures the light intensity of the sample region and the reference region, and then takes a ratio of the two intensities, the measurement accuracy can be significantly reduced if the light that goes through the reference region has a strong scattering from (a) the LGS sidewall or (b) the LGS, or the light that goes from the sample region has a significant scattering from a nearby LSG sidewall.

To reduce the effects of the light scatting by the LGS sidewall on the light from the reference region, the edge of the reference region used for OD determination should be certain distance away from the LGS sidewall. Since the reference region cannot smaller than that of the wavelength of the light without suffering significant light diffraction, therefore to reduce the effects of the light scatting by the LGS sidewall on the light from the reference region, at least the cross-section of LGS should be larger than the wavelength of the light.

In some embodiments, the edge of the reference region used for OD determination is certain distance away from the LGS sidewall.

In some embodiments, the cross-section of LGS should be larger than the wavelength of the light, and the edge of the reference region used for OD determination is certain distance away from the LGS sidewall.

Similar to the light from the reference region, to reduce the effects of the light scattering on the light from the sampling region, the edge of the sampling region should be a certain distance away from the LSG sidewall.

In some embodiments, the edge of the sampling region used for OD determination is certain distance away from the LGS sidewall.

In some embodiments, the edge of the reference region used for OD determination is certain distance away from the LGS sidewall, and the edge of the sampling region used for OD determination is certain distance away from the LGS sidewall.

In some embodiments, the cross-section of LGS should be larger than the wavelength of the light, the edge of the reference region used for OD determination is certain distance away from the LGS sidewall, and the edge of the sampling region used for OD determination is certain distance away from the LGS sidewall.

3.4.2 Areas of Reference Region and Sampling Region, and Distance Between them

In determining an OD of a sample by taking the ratio of the light intensities through the sample region and through the reference region, it assumes that the incident light in each region has the same intensity, or the thickness of the first plate and the second plate and the sample is respectively the same or known in the sampling region and the reference region. However, in many practical optical systems, neither of the above assumption is true, which causes uncertainties (i.e. errors) in determining the OD. For examples, in practice, the intensity of incident light for a sample optical transmission measurement is not uniform, particularly illumination area is large; and the thickness of the first plate, the second plate, and the sample is respectively not the same or known in the sampling region and the reference region, and each may have a significant variation.

According to the disclosure, one way to reduce to errors is to limit the areas of the sampling region and the reference region used to determining an OD of the sample, or make the distance between the sampling region and the reference region small while avoiding the light scattering by the LGS sidewall, or both.

In some embodiments, the area of the sampling region and the distance between the sample region and the reference region are a combination of the above the two paragraphs.

3.4.3 Multiple Pairs of Sampling Region and Reference Region

Using one pair of sample region and the reference region can lead to a large error. This is because several reasons: (i) since the spatial variation of the thickness of the first plate, the second plate, and the sample is respectively random, just one pair of sample region and reference region may not represent the majority of the sample; and (ii) since the numbers of optical imperfection and their locations are also random, these optical imperfection can occur at the location of the sampling region and/or the reference region, making the sampling region and the reference region pair unusable in OTSA.

To solve these problems, according to the disclosure, multiple pairs of the SR regions are used.

In some embodiments, an OAC comprises a plurality of pairs of SR regions, where the distance between the centers of two neighboring SR regions, and the distance is either substantially periodic or aperiodic.

According to the disclosure, reagents for facilitating a test were deposited on the inner surface of the plates of an OAC, the reagents include but not limited to staining reagents, surfactants, antibodies, proteins, and nucleic acids.

A4. Micro-Volume Spectrophotometry Analysis

Another aspect of the disclosure is to provide a device and a method for analyzing the concentration of an analyte in micro-volume liquid based on spectrophotometry.

The device of the disclosure includes a first plate and a second plate.

The first plate is made of optically transparent materials and its top and bottom surfaces are optically flat. The second plate is made of optically transparent materials. On the inner surface of the second plate towards the first plate, there are arrays of uniform-height micro-size light guiding spacers extruded from the surfaces. Both top and bottom surfaces of the second plate, including the end surfaces of the extruded light guiding spacers, are optically flat.

When using the device to analyze a micro-volume solution of analyte, drop the sample liquid on the first plate (or second plate) and then place the second plate (or first plate) on top. The sample liquid forms a liquid layer with uniform thickness which depends on the height of the micro-size light guiding spacers on the second plate.

To do the spectrophotometry measurement, a parallel light beam is incident on the first or second plate of the device in normal direction. A detector on the other side is used to measure the transmitted light intensity in the pillar regions and transmitted intensity outside the spacer regions at a specific wavelength. The absorption of the sample solution is calculated using the measured transmitted intensities. The concentration of the analyte is calculated based on Beer-Lambert law.

4.1 Description of Device

Measuring the absorption of a solution at a specific wavelength and then calculate the concentration of a specific analyte in the solution is a typical application of spectrophotometry. Conventionally, to do such measurement, it requires a large volume of liquid (a few milliliters) to fill a chamber to get a fixed height of liquid layer. If the sample volume is very limited (for example, a few microliters), it is hardly possible to prepare a liquid layer with uniform thickness by conventional sample preparation method.

The disclosure that is described herein address this problem by providing a device comprising a first plate and a bottom plate. Two plates are movable towards each other. Drop the micro-volume sample liquid on the first plate (or second plate) and then place the second plate (or first plate) on top. The sample liquid is embedded between the top plate and the bottom plate to form a liquid layer with uniform height, which provides a low-cost solution to achieve accurate and uniform layer thickness of a micro-volume liquid sample.

In this disclosure, sample in microliter volume is placed on a QMAX card, which make the sample form a thin uniform thickness layer. In the QMAX card, on the inner surface of the second plate towards the first plate, there are arrays of uniform-height micro-size light guiding spacers extruded from the surfaces. The sample liquid embedded between the first plate and the second plate is confined to form a uniform liquid layer due to the uniform-height spacer array on the surface of the second plate.

FIG. 1 is the schematic illustration of cross section of the device in an open configuration. The device consists of a first plate and a second plate. Both plates are moveable relative to each other. The first plate is made of optically transparent material and both top and bottom surfaces are optically flat. The second plate is made of optically transparent material. On the inner surface of the second plate towards the first plate, there are arrays of uniform-height micro-size light guiding spacers extruded from the surfaces. And both top and bottom surfaces of the second plate, including the end surfaces of the extruded light guiding spacers, are optically flat.

FIG. 2 is the schematic illustration of cross section of the device in a close configuration. The sample liquid embedded between the first plate and the second plate is confined to form a uniform liquid layer due to the uniform-height light guiding spacer array on the surface of the second plate.

4.2 Principles and Certain Examples

One objective of the disclosure is related to devices and methods for improving optical transmission analysis of a thin layer of a sample sandwiched between containing between two plates, particularly, for generating a reference signal that can improve the optical analysis, and for an application of assaying an analyte in a sample, e.g. hemoglobin in a blood sample.

Certain biological or chemical properties of a sample can be determined by measuring the absorption coefficient of a thin sample layer, $\alpha_s$, in a light transmission experiment through the sample layer. Using Beer-Lambert's Law, the light absorption coefficient of a thin sample layer, $\alpha_s$, is related to the incident light intensity (i.e. the light incident to the sample), $I_i$, and the transmitted light intensity (i.e. the light goes through the sample), $I_t$:

$$OD = \ln\left(\frac{I_i}{I_t}\right) = \alpha_s L_s,$$

where $L_s$ is the length (i.e. thickness) of the sample layer, and OD is the optical density through the sample layer. The light absorption coefficient of a thin sample layer, $\alpha_s$, can be related a property of the sample. Therefore, using the Beer-Lambert's Law, one can determine a property of a sample by measuring the OD of a sample layer.

However, in practice, it is hard to directly measure the intensity of both incident light (i.e. the light directly incident to a sample layer) and transmitted light (i.e. the light directly transmitted through the sample). Typically, what is measured in experiments are the total light transmission through both the sample and the sample holder (This is because a thin layer sample often needs a sample holder for a measurement, and the light being measured also goes through the sample holder). Therefore, there is a need to separate/determine the OD of a sample from the total light transmission.

According to the disclosure, a particular sample holder, termed OAC (i.e. optical analysis card), is provided, and an optical density of a material is determined by taking a ratio of the intensities of two transmitted lights: one is the light that transmits through the sampling region of the sample holder, and the other is the light that transmits through the reference region of the sample holder, wherein the OD of the sample is determined without directly measuring the incident light.

Example 1—Measure the Concentration of Purified dsDNA, ssDNA or RNA

To measure the concentration of purified dsDNA, ssDNA or RNA in micro-volume solution:

Drop 1-10 uL sample solution on either the first or the second plate.

Close the device by placing the first plate on top of the surface of second plate with extruded light guiding spacer. A sample solution layer with uniform thickness is formed. The thickness of the sample layer is determined by the height of the light guiding spacers, and the typical range is from 1 to 100 um.

As shown in FIG. 2, a parallel light beam from a light source covering UV wavelength range (200 nm to 300 nm) is normally incident on the device from the second plate (or first plate).

As shown in FIG. 2, on the other side of the device, at 260 nm, a photo detector records the transmitted intensity of the light in sampling region Is after passing through the plates and sample liquid layer, and the transmitted intensity of the light in reference region Ir after passing through the light guiding spacer.

At 260 nm, the transmissivity of the sample layer in the device is calculated by the equation $$T = \alpha \cdot I\_s / I\_r$$

where T is the transmissivity of the sample liquid layer at 260 nm, and $\alpha$ is a correction factor to compensate the intensity loss when light passing through the light guiding spacer.

According to Beer-Lambert law, the concentration of total nucleic acid is calculated by the equation $$C = -(Ln(T))/(\varepsilon \cdot t)$$

where C is total concentration of nucleic acid of the sample solution in ng/uL, and c is absorptivity coefficient of nucleic acid at the wavelength of 260 nm in ng-cm/uL, and t is the thickness of the sample solution layer in cm.

Example 2—Measure the Concentration of Purified Nucleic Acids Labeled with Dyes To measure the concentration of purified nucleic acids labeled with dyes in micro-volume solution:

Drop 1-10 uL sample solution on either the first or the second plate.

Close the device by placing the first plate on top of the surface of second plate with extruded light guiding spacer. A sample solution layer with uniform thickness is formed. The thickness of the sample layer is determined by the height of the light guiding spacers, and the typical range is from 1 to 100 um.

As shown in FIG. 2, a parallel light beam from a light source covering the absorbance wavelength of dye is normally incident on the device from the second plate (or first plate).

As shown in FIG. 2, on the other side of the device, at the absorbance wavelength of dye, a photo detector records the transmitted intensity of the light in sampling region Is after passing through the plates and sample liquid layer, and the transmitted intensity of the light in reference region Ir after passing through the light guiding spacer.

At the dye absorbance wavelength, the transmissivity of the sample layer in the device is calculated by the equation $$T = \alpha \cdot I\_s / I\_r$$

where T is the transmissivity of the sample liquid layer at that specific wavelength, and a is a correction factor to compensate the intensity loss when light passing through the light guiding spacer.

According to Beer-Lambert law, the concentration of the dye of interest is calculated by the equation $$C = -(Ln(T))/(\varepsilon \cdot t)$$

where C is total concentration of the dye of interest in ng/uL, and ε is absorptivity coefficient of the dye of interest at the absorbance wavelength in ng-cm/uL, and t is the thickness of the sample solution layer in cm.

Example 3—Measure the Concentration of Purified Proteins

To measure the concentration of purified proteins in micro-volume solution:

Drop 1-10 uL sample solution on either the first or second plate.

Close the device by placing the first plate on top of the surface of second plate with extruded light guiding spacer. A sample solution layer with uniform thickness is formed. The thickness of the sample layer is determined by the height of the light guiding spacers, and the typical range is from 1 to 100 um.

As shown in FIG. 2, a parallel light beam from a light source covering UV wavelength range (200 nm to 300 nm) is normally incident on the device from the second plate (or first plate).

As shown in FIG. 2, on the other side of the device, at 280 nm, a photo detector records the transmitted intensity of the light in sampling region Is after passing through the plates and sample liquid layer, and the transmitted intensity of the light in reference region Ir after passing through the light guiding spacer.

At 280 nm, the transmissivity of the sample layer in the device is calculated by the equation $$T = \alpha \cdot I\_s / I\_r$$

where T is the transmissivity of the sample liquid layer at 280 nm, and α is a correction factor to compensate the intensity loss when light passing through the light guiding spacer.

According to Beer-Lambert law, the concentration of proteins is calculated by the equation $$C = -(Ln(T))/(\varepsilon \cdot t)$$

where C is total concentration of proteins of the sample solution in ng/uL, and ε is absorptivity coefficient of proteins at the wavelength of 280 nm in ng-cm/uL, and t is the thickness of the sample solution layer in cm.

Example 4—Measure the Concentration of Purified Proteins Labeled with Dyes

To measure the concentration of purified proteins labeled with dyes in micro-volume solution:

Drop 1-10 uL sample solution on either the first or the second plate.

Close the device by placing the first plate on top of the surface of second plate with extruded light guiding spacer. A sample solution layer with uniform thickness is formed. The thickness of the sample layer is determined by the height of the light guiding spacers, and the typical range is from 1 to 100 um.

As shown in FIG. 2, a parallel light beam from a light source covering the absorbance wavelength of dye is normally incident on the device from the second plate (or first plate).

As shown in FIG. 2, on the other side of the device, at the absorbance wavelength of dye, a photo detector records the transmitted intensity of the light in sampling region Is after passing through the plates and sample liquid layer, and the transmitted intensity of the light in reference region Ir after passing through the light guiding spacer.

At the dye absorbance wavelength, the transmissivity of the sample layer in the device is calculated by the equation $$T = \alpha \cdot I\_s / I\_r$$

where T is the transmissivity of the sample liquid layer at that specific wavelength, and a is a correction factor to compensate the intensity loss when light passing through the light guiding spacer.

According to Beer-Lambert law, the concentration of the dye of interest is calculated by the equation $$C = -(Ln(T))/(\varepsilon \cdot t)$$

where C is total concentration of the dye of interest in ng/uL, and ε is absorptivity coefficient of the dye of interest at the absorbance wavelength in ng-cm/uL, and t is the thickness of the sample solution layer in cm.

Example 5—Measure the Concentration and Absorbance of any Analyte in Sample Solution To measure the concentration and absorbance of any analyte in micro-volume solution:

Drop 1-10 uL sample solution on either the first or the second plate.

Close the device by placing the first plate on top of the surface of second plate with extruded light guiding spacer. A sample solution layer with uniform thickness is formed.

The thickness of the sample layer is determined by the height of the light guiding spacers, and the typical range is from 1 to 100 um.

As shown in FIG. 2, a parallel light beam from a light source covering the absorbance wavelength of dye is normally incident on the device from the second plate (or first plate).

As shown in FIG. 2, on the other side of the device, at the absorbance wavelength of dye, a photo detector records the transmitted intensity of the light in sampling region Is after passing through the plates and sample liquid layer, and the transmitted intensity of the light in reference region Ir after passing through the light guiding spacer.

At the absorbance wavelength of interest, the absorbance and transmissivity of the sample solution layer in the device is calculated by the equation $$A = 1 - \alpha \cdot l\_s/l\_r$$

$$T = \alpha \cdot l\_s/l\_r$$

where A and T are the absorbance and transmissivity of the sample liquid layer at that specific wavelength, and a is a correction factor to compensate the intensity loss when light passing through the light guiding spacer.

According to Beer-Lambert law, the concentration of the analyte of interest is calculated by the equation $$C = -(Ln(T))/(\varepsilon \cdot t)$$

where C is total concentration of the analyte of interest in ng/uL, and ε is absorptivity coefficient of the analyte of interest at the absorbance wavelength in ng-cm/uL, and t is the thickness of the sample solution layer in cm.

The invention claimed is:

1. An optical system for measuring an optical property of a thin layer of material, comprising:
   a light source;
   an optical fiber;
   a beam splitter;
   a slit;
   an external first lens;
   a grating;
   a camera module having a second lens; and
   a sample holder;
   wherein:
   the sample holder comprises a first plate, a second plate, a light guiding spacer (LGS), a sampling region, and a reference region, wherein:
   (i) the first plate and the second plate are movable relative to each other into different configurations including an open configuration and a closed configuration,
   wherein in the open configuration, the first and second plates are at least partially separated apart, in the closed configuration, the first and second plate are configured to sandwich a sample into a thin layer of a thickness of 500 μm or less between the first and second plates, and each of the first and second plates has a sample contact area on its inner surface that contacts the sample;
   (ii) in the closed configuration, the light-guiding spacer (LGS) is disposed between the first and second plates, the LGS has a pillar shape with each end in direct contact to one of the first and second plates to form an LGS-plate contact area, which allows a light transmits from the first plate, through the LGS, to the second plate without going through a sample;
   (iii) the sampling region is a region where the light goes through, in order, the first plate, the sample, and the second plate, wherein the sampling region does not have the LGS; and
   (iv) the reference region is the region where the light transmits through, in order, the first plate, the light-guiding spacer, and the second plate, without going through the sample;
   the light source generates photons;
   the optical fiber transmits the photons from the source through the beam splitter to illuminate and interrogate a sample;
   the light from the interrogated sample passes through the beam splitter, the slit, the external first lens, the grating, and then to the camera module;
   the camera module is part of a smartphone,
   the external first lens, the slit, the beam splitter and the sample are aligned on a same optical axis which is perpendicular to the plane of the grating, and
   the optical system measures and records the light spectrum of the sample.

2. The optical system of claim 1, further comprising optics lever, wherein the optics lever has components of two or more different optical systems mounted to the optics lever, and the optics lever is movable to select the optical functionality of the optical system.

3. The optical system of claim 1, wherein the light source is an LED, laser, fluorescent bulb, filament lamp, or any combination thereof.

4. The optical system of claim 1, wherein the spectrum of the light source is UV, visible, IR, or any combination thereof.

5. The optical system of claim 1, wherein the bandwidth spectrum of the light source is at least one value selected from 10 nm to 100 μm.

6. The optical system of claim 1, wherein the beam splitter is a cube beam splitter, a plate beam splitter, or any combination thereof.

7. The optical system of claim 1, wherein the reflection transmission ratio of the beam splitter is at least one value selected from 10:90 to 40:60.

8. The optical system of claim 1, wherein the light beam is generated for a measurement selected from at least one of: plasmonic, fluorescent, absorption, colorimetric, or a combination of any two measurements.

9. The optical system of claim 1, wherein the slit has a width of at least 0.1 μm.

10. The optical system of claim 1, wherein the slit has a width of from 1 μm to 5 μm.

11. The optical system of claim 1, wherein the external first lens and the second lens of the camera module are the same type of lens.

12. The optical system of claim 1, wherein the effective focal length of the external first lens is less than 20 mm.

13. The optical system of claim 1, wherein the grating is a transmission grating, or a blazed grating.

14. The optical system of claim 1, wherein the pitch of the grating is at least one of 2000 l/mm, 1200 l/mm, 800 l/mm, 300 l/mm, or any intermediate value or range combination.

15. The optical system of claim 1, wherein the pitch of the grating is at least one of 800 lines/mm, 1200 lines/mm, or any intermediate value or range combination.

16. The optical system of claim 1, wherein the external first lens, the slit, and the beam splitter are aligned on the same optical axis and the optical axis is perpendicular to the grating.

17. The optical system of claim 1, wherein the optical axis of the camera module is not perpendicular to the grating, and the angle between the optical axis and a grating axis is from 20 to 80 degrees, or any intermediate value or range combination.

18. The optical system of claim 1, wherein the optical axis of the camera module is not perpendicular to the pitch of the grating, the angle between the optical axis and the grating axis is from 30 to 50 degrees for visible light, and the pitch of the grating is from 800 l/mm to 1200 l/mm.

19. The optical system of claim 1, wherein the optics lever mounts an optical element of multiple different optical systems at different positions and moves the optical element between different positions to switch the functionality of the optical system.

20. The optical system of claim 1, further comprising an optical lever, wherein the optics lever comprises two planes of an upper first plane and a lower second plane situated at different heights.

21. The optical system of claim 20, wherein the upper first plane comprises an optical filter.

22. The optical system of claim 20, wherein the upper first plane moves into light from the light source, and the distance between the upper first plane and the light source is from 0 to 5 mm.

23. The optical system of claim 20, wherein the lower second plane is not parallel to an image sensor plane of the camera module.

24. The optical system of claim 20, wherein the lower second plane is not parallel to an image sensor plane of the camera module, and the surface of the non-parallel lower second plane has a mirror finish with high reflectivity greater than 95%.

25. The optical system of claim 20, the lower second plane is not parallel to the upper first plane, and the lower second plane comprises a surface having a mirror finish that is capable of deflecting light to back-illuminate the sample region.

26. The optical system of claim 20, wherein the lower second plane is not parallel to the upper first plane.

27. The optical system of claim 20, wherein a part of the lower second plane is parallel to an image sensor plane of the camera module and is located under the light source and separated from the sample by 1 mm to 10 mm.

28. The optical system of claim 20, wherein a part of the lower second plane is parallel to an image sensor plane of the camera module, and a surface of the part of the lower second plane is highly light absorptive with light absorption greater than 95%.

29. The optical system of claim 1, wherein a part of the lower second plane is parallel to an image sensor plane of the camera module, and a surface of the part of the lower second plane is highly light absorptive and eliminates a reflective light back-illuminating on the sample for small incidence angles.

30. The optical system of claim 1, wherein the optics lever further comprises a stopper configured to stop the optics lever.

31. The optical system of claim 1, wherein the optics lever includes a sample slider having a fixed track frame and a moveable arm housing lever.

32. The optical system of claim 31, wherein the distance between a first plane on the moveable arm housing lever and the light source is in a range of 0.5 mm to 100 mm.

33. The optical system of claim 20, wherein the lower second plane is connected to a tilted plane, and a mirror is mounted on the tilted plane.

34. The optical system of claim 1, wherein the light source is a part of the smartphone.

35. The optical system of claim 1, wherein the optical axis of the smartphone camera is not perpendicular to the grating and includes an angle less than 90 degrees.

36. The optical system of claim 1, further comprising:
a second camera module in the smartphone;
a second grating, a second slit, a second external lens, and a second beam splitter;
wherein:
the optical fiber guides the light from the light source to the first beam splitter,
the first beam splitter is configured to pass a portion of the light to the second beam splitter and redirects a portion of the light to a first sample;
the second beam splitter is configured to redirect the light from the first beam splitter to a second sample;
the light from the first sample goes through the first beam splitter, first slit, first external lens, first grating to form a spectrum image on the first camera module,
the light by the second sample area goes through the second beam splitter, second slit, second external lens, and second grating to form a spectrum image in the second camera module of the smartphone, and
the second external lens, second slit, second beam splitter and second sample are aligned on a same optical axis which is perpendicular to the second grating.

37. A method of measuring a spectrum of light, comprising:
obtaining the optical system of claim 1;
obtaining a sample; and
measuring a spectrum of light from the sample.

38. A method of measuring a spectrum of light, comprising:
obtaining the optical system of claim 36; and
obtaining a sample; and measuring a spectrum of light from the sample.

39. The apparatus of claim 1, wherein the LGS-plate contact area and a lateral cross-section of the LGS are larger than the wavelength of the light.

40. The optical system of claim 1, further comprising:
a second optical fiber;
a second light source;
a second lens, a second grating; and
a second camera;
wherein the second camera measures the light beam from the second light source.

* * * * *